United States Patent
Takahashi et al.

[11] 3,862,004
[45] Jan. 21, 1975

[54] METHOD FOR PRODUCTION OF CEPHALOSPORINS

[75] Inventors: Takeshi Takahashi; Yoshio Yamazaki, both of Osaka; Koichi Kato, Kobe; Masao Isono, Hyogo, all of Japan

[73] Assignee: Takeda Chemical Industries, Ltd., Osaka, Japan

[22] Filed: May 31, 1973

[21] Appl. No.: 365,727

[30] Foreign Application Priority Data
Dec. 6, 1972 Japan............................ 47-122206

[52] U.S. Cl..................... 195/29, 195/30, 195/36 R
[51] Int. Cl............................................. C12d 9/00
[58] Field of Search.................. 195/29, 36 R, 30

[56] References Cited
UNITED STATES PATENTS
3,284,451  11/1966  Cheney et al..................... 260/243 C
3,763,000  10/1973  Abe et al............................. 195/30

Primary Examiner—Alvin E. Tanenholtz
Attorney, Agent, or Firm—Wenderoth, Lind & Ponack

[57] ABSTRACT

Cephalosporins of the formula

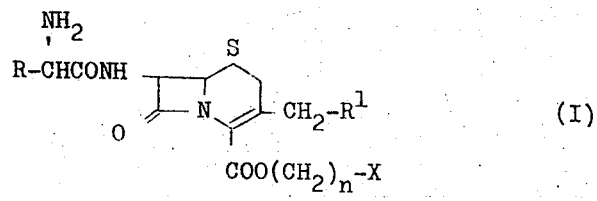

(I)

wherein R stands for a six-membered cyclic hydrocarbon residue which is either substitued or unsubstituted and either saturated or unsaturated, or an unsaturated five-membered heterocyclic residue containing one hetero-atom in its ring; $R^1$ stands for a hydrogen atom or $-OR^2$ wherein $R^2$ is an organic group; $n$ is 1 or 2; and X is $-OR^3$, $-SO_mR^3$, $-NH_2$ or $-CN$, where $R^3$ stands for an alkyl group of 1 to 3 carbon atoms or a phenyl group and $m$ is 0, 1 or 2, are produced by condensation between (1) an α-substituted-α-amino acid of the formula

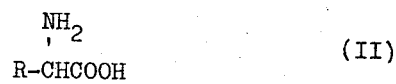

(II)

wherein R has the aforementioned significance, or its reactive derivative and (2) a 7-aminocephem compound of the formula

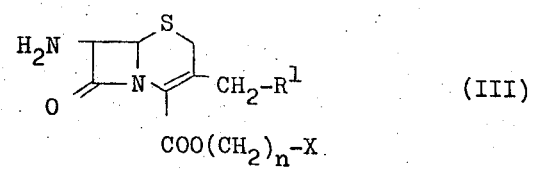

(III)

wherein $R^1$, $n$ an X have the aforementioned significances through the utilization of a microorganism having a cephalosporin-synthesizing activity.

11 Claims, No Drawings

METHOD FOR PRODUCTION OF CEPHALOSPORINS

The present invention relates to a novel and industrially advantageous method for the production of cephalosporins.

More particularly, the present invention relates to a method for the production of a cephalosporin of the formula

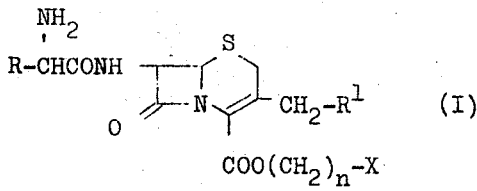

wherein R stands for a six-membered cyclic hydrocarbon residue which is either substituted or unsubstituted and either saturated or unsaturated or an unsaturated five-membered heterocyclic residue containing one heteroatom in its ring; $R^1$ stands for a hydrogen atom of $-OR^2$ wherein $R^2$ is an organic group; $n$ is 1 or 2; and X is $-OR^3$, $-SO_mR^3$, $-NH_2$ or $-CN$, where $R^3$ stands for an alkyl group of 1 to 3 carbon atoms or a phenyl group and m is 0, 1 or 2, by condensation between (1) an α-substituted-α-amino acid of the formula

wherein R has the aforementioned significance, or its reactive derivative and (2) a 7-aminocephem compound of the formula

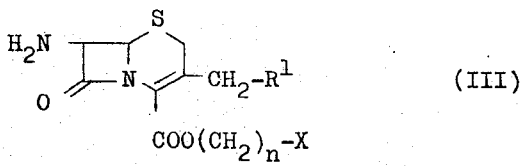

wherein $R^1$, $n$ and X have the aforementioned significances through the utilization of a microorganism having a cephalosporin-synthesizing activity, the said microorganism belonging to a family Pseudomonadaceae, especially, to a genus Mycoplana, Protaminobacter, Acetobacter, Gluconobacter, Xanthomonas or Pseudomonas.

7-Aminocephem compounds which are of importance as intermediates for the synthesis of various kinds of cephalosporins have been obtained in the form of its 4-carboxylic acid esters in most cases.

The ester residue has been selected from among the groups which can be readily de-esterified without affecting the remainder of the structure. Among the most frequently employed esters are the benzyl esters, bis-(p-methoxyphenyl) methyl esters and 2,2,2-trichloroethyl esters which are mentioned in Belgian Pat. No. 717741; the benzhydryl esters mentioned in Japanese Pat. No. 25746/1971; the 3,5-dimethoxybenzyl esters mentioned in Japanese Pat. No. 28557/1971; 3,5-di-tert. butyl-4-hydroxybenzyl esters mentioned in Japanese Pat. No. 28556/1971; the tert. butyl esters mentioned in Japanese Pat. No. 28559/1971; and the triphenylmethyl esters mentioned in Japanese Pat. No. 22831/1972.

The 7-aminocephem-4-carboxylic acid ester may be converted to the final product cephalosporin by the steps of de-esterifying the ester chemically or enzymatically to give the free 7-aminocephem-4-carboxylic acid and, then, subjecting the acid to N-acylation. It is also possible to acylate chemically the 7-position of the ester and then, de-esterify the acylated product to obtain the desired cephalosporin compound.

On the other hand, in the production of cephalosporins including their esters by the chemical condensation reaction between α-substituted-α-amino acids and 7-aminocephem-4-carboxylic acids or their esters, it has been required either to previously protect amino group of the amino acids to avoid undesirable side reactions or to previously convert the amino group into a radical such as azide group ($N_3$) which can easily be reconverted into amino group. Thus, it is necessary after the condensation reaction either to remove the protective group from the amino group or to reconvert said radical into amino group, and these side-step procedures must be conducted under moderate conditions so as not to give any influence on the moieties other than that concerned with these reactions, especially so as not to split the cephem nucleus or the acid amide linkage in the side chain at its 7-position. These side-step procedures inevitably decrease the yield of the objective cephalosporins.

We previously developed a method for the production of cephalosporin compounds of the formula (I')

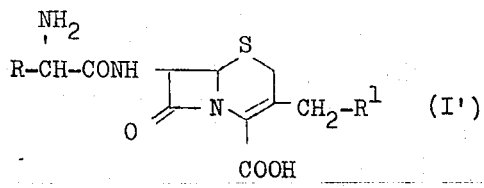

wherein R and $R^1$ have the same meaning defined above from an α-substituted-α-amino acid (II) or a reactive derivative thereof and a 7-aminocephem-4-carboxylic acid compound by an enzymatic procedure which does not require the previous protection of the amino group (Japanese Pat. No. 25388/1972). However, it is difficult to isolate in a high yield the desired cephalosporin compound (I') from the reaction mixture containing a large amount of α-substituted-α-amino acid (II) which is left as such or is produced from the reactive derivative thereof during the reaction because both α-substituted-α-amino acid (II) and desired cephalosporin compound (I') are amphoteric substances and their physical properties are very close to each other.

We attempted to effect the condensation reaction of an α-substituted-α-amino acid (II) or a reactive derivative thereof with an ester of a 7-aminocephem-4-carboxylic acid, particularly one of the above-mentioned esters, in place of the very 7-aminocephem-4-carboxylic acid and found out that, as shown in the reference example given below, the yields of the corresponding cephalosporin esters are considerably lower than the yields of cephalosporin compounds as produced using 7-aminocephem-4-carboxylic acid.

Subsequent studies on the effects of an extensive list of ester residues on the condensation reaction between a 7-aminocephem-4-carboxylic acid ester and an α-substituted-α-amino acid (II) or a reactive derivative thereof led to the surprising discovery that the 7-aminocephem-4-carboxylic acid esters carrying, for example, a member of the group of ester residues which are represented by the general formula: $-CH_2CH_2X$ (wherein X represents $SO_2R^3$, $NH_2$ or CN and $R^3$ is a lower alkyl group of 1 to 3 carbon atoms, a phenyl group which may be substituted) or a member of the group of esters which are represented by the general formula $-CH_2X$ (wherein X represents $-OR^2$, $SR^2$ or $SOR^2$ where $R^2$ is as defined above) undergo enzymatic condensation reactions with the α-substituted-α-amino acid compounds to give cephalosporin esters (I) in high yields.

Thus, the object of the present invention is to provide a microbial method for the production of cephalosporin esters (I) from α-substituted-α-amino acid (II) or its reactive derivative and the 7-aminocephem-4-carboxylic acid ester (III), which is novel and far more advantageous than the known chemical methods.

Another object of the present invention is to provide a method for the production of cephalosporin esters (I) in which isolation of the desired cephalosporin ester (I) from the reaction mixture containing α-substituted-α-amino acid (II) is very easy.

Further objects of the present invention will become apparent as the following specification proceeds.

Referring to the above-described formula (II), R is a saturated or unsaturated, substituted or unsubstituted six-membered cyclic hydrocarbon residue or an unsaturated five-membered heterocyclic residue containing one hetero atom. As the six-membered cyclic hydrocarbon residue there may be counted phenyl, cyclohexenyls (i.e., 1-cyclohexenyl, 2-cyclohexenyl and 3-cyclohexenyl), cyclohexadienyls (i.e. 1,3-cyclohexadienyl, 1,4-cyclohexadienyl, 1,5-cyclohexadienyl and 2,5-cyclohexadienyl) and cyclohexyl. Each of these hydrocarbon residues may have a substituent or substituents on its ring, The substituents may be exemplified by hydroxyl; halogens (e.g., bromine, chlorine, iodide); alkyls such as lower alkyl (e.g., methyl, ethyl, propyl, isopropyl); alkenyl such as lower alkenyl (e.g., vinyl, allyl); alkoxys such as lower alkoxy (e.g., methoxy, ethoxy, propoxy, isopropoxy); carboxyl; mercapto; cyano; nitro; sulfo; amino; sulfamino; carboxyalkyl such as carboxyloweralkyl (e.g., carboxymethyl, carboxyethyl, carboxypropyl, carboxyisopropyl) and the like. As the five-membered heterocyclic residue there may be mentioned those containing one hetero atom from among O,S and N, for example, thienyl (i.e., 2-thienyl or 3-thienyl), furyl (i.e., 2-furyl or 3-furyl) and the like.

Accordingly the α-substituted-α-amino acid is exemplified by phenylglycine, cyclohexadienylglycine, cyclohexenylglycine, cyclohexylglycine, 2-thienylglycine, 2-furylglycine, parahydroxyphenylglycine, paramercaptophenylglycine, paracarboxyphenylglycine, parasulfoxyphenylglycine, paraaminophenylglycine, paranitrophenylglycine, parachlorophenylglycine, parabromophenylglycine, paramethylphenylglycine, paraethylphenylglycine, paramethoxyphenylglycine, paracyanophenylglycine, parasulfaminophenylglycine, and so forth. Though the above exemplary compounds are para-substituted compounds having the same substituents in the ortho- or meta-position of phenylglycine are of course useful. Furthermore, the compounds having two or more of the same or different substituents on the respective rings can also be employed. These compounds can be synthesized, for example, by Strecker's reaction from aldehydes having the corresponding groups R.

The α-substituted-α-amino acid (II) may be employed in the free form or as its salt, e.g., hydrochloride, sodium or potassium salt.

The reactive derivatives of these α-substituted-α-amino acids (II) may be any derivative substituted at the carboxylic moiety which yields the α-substituted-α-amino acids (II) when hydrolyzed in an aqueous medium by the microorganism to be employed in the present invention. Typical examples of the reactive derivatives are alkyl esters such as lower alkyl esters (e.g., methyl esters, ethyl esters, n-propyl esters, and isopropyl esters) of the α-substituted-α-amino acids (II), aralkyl esters such as phenyl lower alkyl esters (e.g., benzyl esters, phenethyl esters and phenylpropyl esters) of the same, aryl esters (e.g., phenyl esters) of the same, alkylthio esters (e.g., methylthio esters and thioglycol esters) of the same, amide of the same, dipeptides between the same and another amino acid (e.g., N-(phenylglycyl) glycine) and the like.

Referring to the formula (III), $R^1$ represents a hydrogen or $-OR^2$ wherein $R^2$ is an organic group. As said organic group, there may be enumerated, for example, an alkyl such as a lower alkyl (e.g., methyl, ethyl, n-propyl, isopropyl) an alkenyl such as a lower alkenyl (e.g., vinyl, allyl), an alkanoyl such as a lower alkanoyl (e.g., acetyl, n-propionyl, isopropionyl), an alkylthiocarbonyl such as a lower alkylthiocarbonyl (e.g., methylthiocarbonyl, ethylthiocarbonyl, propionylthiocarbonyl). X is a group represented by $-OR^3$, $-SO_mR^3$, $NH_2$ or CN wherein $R^3$ is an alkyl having up to 3 carbon atoms such as methyl, ethyl, n-propyl or iso-propyl or a phenyl group and $m$ is 0, 1 or 2.

Accordingly, the 7-aminocephem-4-carboxylic acid ester (III) is exemplified by 7-aminocephalosporanic acid methoxymethyl ester, 7-amino-3-desacetoxycephalosporanic acid methylsulfonylethyl ester, 7-amino-3-cephem-3-methoxymethyl-4-carboxylic acid methylthiomethyl ester, 7-amino-3-cephem-3-(2-(1-oxopyridyl)thiomethyl)-4-carboxylic acid cyanoethyl ester, 7-amino-3-desacetoxycephalosporanic acid ethylsulfonylethyl ester, 7-amino-3-desacetoxycephalosporanic acid phenylsulfonylethyl ester, 7-amino-3-desacetoxycephalosporanic acid methylsulfinylmethyl ester, 7-amino-3-(1-pyridylmethyl)-3-cephem-4-carboxylic acid cyanoethyl ester, 7-amino-3-(1-(4-carboxamidopyridyl)-methyl)-3-cephem-4-carboxylic acid methoxymethyl ester, 7-amino-3-methylthiocarboxymethyl-3-cephem-4-carboxylic acid aminoethyl ester, 7-amino-3-trimethylaminomethyl-3-cephem-4-carboxylic acid methylthiomethyl ester, 7-amino-3-dimethyldithiocarbamylmethyl-3-cephem-4-carboxylic acid methoxymethyl ester, 7-amino-3-azidomethyl-3-cephem-4-carboxylic acid methoxymethyl ester, 7-amino-3-benzyloxycarbonylaminomethyl-3-cephem-4-carboxylic acid methylthiomethyl ester, etc.

While some of these 7-aminocephem-4-carboxylic acid esters are novel compounds, they can be prepared by one of the per se known procedures described below.

1. The alcohol ($HO(CH_2)_nX$) corresponding to the particular ester residue or a reactive derivative of the alcohol such as chloroformates of the alcohols (e.g., methylsulfonylethyl chloroformate) is allowed to act upon penicillin G or V to obtain a penicillin G ester or penicillin V ester which, in turn, is caused to undergo a ring-enlarging reaction to give the corresponding 7-acyl-3-desacetoxycephalosporanic acid ester and, then, the 7-position of the last-mentioned compound is deacylated to obtain the desired 7-amino-3-desacetoxycephalosporanic acid ester.

2. After the amino group of cephalosporin C has been protected, the compound is reacted with the alcohol corresponding to the desired ester residue or a reactive derivative of the alcohol to prepare the corresponding cephalosporin C ester and, then, the 7-acyl group is detached by a chemical or an enzymatic procedure to obtain the desired 7-aminocephalosporanic acid ester.

3. The process in which the 3-position of cephalosporin C is modified as required and, then, the above procedure (2) is followed to obtain the desired 7-aminocephem-4-carboxylic acid ester.

The microorganism to be employed according to this invention may be selected from among the strains stored at microorganism depositories or isolated from the natural kingdom, e.g. from the soil, sewage water, marine water, flowers, fruits and atmosphere. If among these microorganisms are the strains which will produce undesirable enzymes, such as β-lactamase II (cephalosporinase) and esterase, which act upon and modify the desired product cephalosporin esters (II), it is possible to derive mutants which will not produce such undesirable enzymes.

All the mutants which can be derived from the above-mentioned microorganisms by the conventional means and which have activity to synthesize the desired cephalosporin esters can also be utilized in the practice of this invention.

The following is a partial list of the known cultures deposited at the Institute for Fermentation, Osaka, Japan (IFO) or the National Institute of Agricultural Sciences, Ministry of Agriculture and Forestry, Japan (NARI), which can be utilized to advantage for the purposes of this invention. Throughout the specification the IFO and NARI numbers mean the accession numbers of the microorganisms at the respective Institutes: *Acetobacter acetosus* IFO-3296, *Gluconobacter albidus* IFO-3251, *Acetobacter aurantium* IFO-3245, *Acetobacter aurantium* IFO-3249, *Gluconobacter cerinus* IFO-3262, *Gluconobacter industrius* IFO-3260, *Gluconobacter dioxyacetonicus* IFO-3272, *Gluconobacter gluconicus* IFO-8171, *Gluconobacter liquefaciens* IFO-12388, *Gluconobacter melagenogenes* IFO-3293, *Gluconobacter oxydans* IFO-3189, *Acetobacter pasteurianus* IFO-3223, *Gluconobacter suboxydans* IFO-3130, *Acetobacter turbidans* IFO-3225, *Acetobacter xylinum* IFO-3144, *Acetobacter xylinum* IFO-3288, *Xanthomonas citri* IFO-3835, *Xanthomonas pruni* IFO-3780, *Xanthomonas oryzae* IFO-3995, *Xanthomonas campestris* NARI X 1-1-1, *Xanthomonas cucurbitae* NARI X 1-3-1, *Xanthomonas hyacinthi* NARI X 1-4-1, *Xanthomonas phaseoli f.sp.alfalta* NARI X 1-6-1, *Xanthomonas phaseoli f.sp. sojense* NARI X 1-7-1, *Xanthomonas physalidicola* NARI X 1-8-1, *Pseudomonas aeruginosa* IFO-3454, *Pseudomonas convexa* IFO-12662, *Pseudomonas maltophila* IFO-12690, *Pseudomonas melanogenum* IFO-12020, *Pseudomonas vendrelli* IFO-3899, and so forth. Typical of the strains of microorganisms isolated from the natural kingdom are *Mycoplana dimorpha* IFO-13213, *Mycoplana bullata* IFO-13267, *Protaminobacter alboflavus* IFO-13221 and so on.

To produce the desired cephalosporin ester (I) with the aid of the enzymatic action of such a microorganism capable of synthesizing cephalosporin esters (I), it is usually desirable to first cultivate the microorganisms and then contact the resulting culture broth or a cephalosporin-synthesizing-enzyme-containing processed matter derived therefrom with an α-substituted-α-amino acid (II) or a reactive derivative thereof and a 7-aminocephem-4-carboxylic acid ester (III) under suitable conditions.

The method of culture for obtaining the above-mentioned culture broth may be any of aerobic stirred culture, shake culture and static culture, and it is usually advisable to cultivate the organism under aerobic conditions. As regards the composition of the culture medium, one or more of the natural materials which are routinely employed, such as meat extract, yeast extract, peptone, casamino acid, corn steep liquor, etc., are employed and as required, are supplemented with such carbonaceus compounds as sugars, organic acids, n-paraffins, etc.; various inorganic and organic nitrogenous compounds including ammonium-nitrogen and nitrate-nitrogen; phosphates, magnesium salts, sodium chloride and other metallic ions; various vitamins; and so forth. The pH of the medium is adjusted between about 6 and about 8. The desirable incubation temperature ranges from 20° to 40°C and, more desirably, from 24° to 37°C. While the incubation time depends upon the particular strain of microorganism used and the conditions of cultivation, especially the cultural equipment, medium composition and incubation temperature, it is advisable to terminate the cultivation at the time when the cephalosporin-synthesizing activity of the organism is maximal, i.e., the time which lies somewhere between the late stage of the logarithmic growth phase and the early stage of the stationary phase of growth. In general, cultivation time ranges from about 8 to about 60 hours.

The culture broth thus obtained, or the enzymecontaining processed matter derived therefrom, is used in the reaction leading to the synthesis of the desired cephalosporin ester (I). The enzyme-containing processed matter obtained from the culture broth is any and all materials having cephalosporinoster-synthesizing activity obtained by processing the culture broth. For example, when the above cephalosporin-synthesizing activity occurs intracellularly, the enzyme-containing processed matter may include (1) the cells harvested from the culture broth and washed, (2) the cell-free extract which can be obtained by subjecting the cells to a known processing procedure, (3) the partially or completely purified cephalosporin-synthesizing enzyme which can be obtained from said cell-free extract by a known procedure, and (4) the cephalosporin-synthesizing enzyme which is obtainable by attaching either chemically or physically the partially or wholly purified activity to a water-insoluble high molecular substance. In case the cephalosporin-synthesizing activity occurs extracellularly, the enzyme-containing processed matter may include, among others, (1) the supernatant fluid obtainable upon removal of cells from the culture broth, (2) the partially or thoroughly purified cephalosporin-synthesizing enzyme which can be obtained by subjecting said supernatant to a known enzyme purification method, and (3)

the cephalosporin-synthesizing enzyme which has been attached either physically or chemically to a water-insoluble high molecular substance.

In the production of a cephalosporin ester (I) by reacting an α-substituted-α-amino acid (II) or a reactive derivative thereof with a 7-aminocephem-4-carboxylic acid ester (III) in the presence of said broth or the enzyme-containing processed matter, the condensation reaction is generally preferably carried out in aqueous solution. In this connection, the reaction system is desirably controlled to pH 4 to 8 and, for better results, to pH 5 to 7. When the culture broth or the enzyme-containing processed matter is water-soluble, the above condensation reaction is carried out in solution. On the other hand, when the broth or the enzyme-containing processed matter is water-insoluble, the above reaction is conducted in suspension or carried out in such a manner that an aqueous solution containing an α-substituted-α-amino acid (II) or a reactive derivative thereof and an 7-aminocephem-4-carboxylic acid ester (III) is passed through a column packed with the water-insoluble cephalosporin-synthesizing activity, in which case the condensation reaction takes place as the aqueous solution flows down the column. In these instances, a water-soluble organic solvent such as alcohol or acetone, for instance, may be incorporated in the reaction system so as to increase the yield of the condensation reaction. The reaction time usually ranges from 10 to 300 minutes, depending upon the concentration of the substrates, the strength of the cephalosporin-ester-synthetic activity and the reaction temperature, among others. The reaction temperature lies somewhere between 5° and 50°C. The concentration of the substrate is determined chiefly with reference to the strength of the cephalosporinester-synthetic activity; usually, 7-aminocephem-4-carboxylic acid ester (III) is used in a concentration of 0.1 to 10 percent. To improve the yield of cephalosporin ester (I) with respect to the 7-aminocephem-4-carboxylic acid ester (III), it is desirable to use the α-substituted-α-amino acid (II) or reactive derivative thereof in the concentration corresponding to one or more equivalent relative to the ester and, if possible, 2 or more molecular equivalents.

The cephalosporin ester (I) which has thus been synthesized from an α-substituted-α-amino acid (II) or a reactive derivative thereof and a 7-aminocephem-4-carboxylic acid ester (III) in the presence of the abovedescribed culture or processed matter can easily be isolated from the reaction mixture containing α-substituted-α-amino acid (II), for instance, with an ion-exchange resin or utilizing a difference between solubilities of the compound (I) and the compound (II) at isoelectric points of the compound (II). The compound (III) can also be purified from the reaction mixture under mild conditions by known means, e.g., by chromatography or by the use of an organic acid or organic base which is capable of forming a water-insoluble salt with the cephalosporin ester (I).

Among the cephalosporin esters (I), those wherein X is $-SO_mR^3$ ($m$ is 0, 1 or 2 and $R^3$ is an alkyl group having up to 3 carbon atoms) are new compounds.

The cephalosporin esters (I) can easily be derived by treating with, for example, an alkali solution to the corresponding cephalosporins (I') mentioned above.

Throughout the specification, the abbreviations "mμ," "ml.", "l.," "°C," "mM" and "N" respectively refer to "millimicrons," "milliliter(s)," "liter(s)," "degrees centigrade," "millimolar concentration" and "normality"; percents (%) are weight per volume, i.e., "grams per deciliter," unless otherwise specified.

The three different medium compositions used in Reference Examples and Examples are given below.

| | |
|---|---|
| (Medium A) | |
| Sodium glutamate | 0.2 % |
| Yeast extract | 0.2 % |
| Peptone | 0.5 % |
| Potassium monohydrogen phosphate | 0.2 % |
| Magnesium chloride | 0.1 % |
| Ferrous sulfate | 0.01 % |
| Sucrose | 2.0 % |
| | pH 7.2 |
| (Medium B) | |
| Potato infusion | 10 % |
| Yeast extract | 1.0 % |
| Thioglycolic acid medium (Daigo Nutritive Chemicals Ltd., Co.) | 1.0 % |
| Glycerin | 1.5 % |
| Glucose | 0.3 % |
| | pH 7 |
| (Medium C) | |
| Meat extract | 1.0 % |
| Peptone | 1.0 % |
| Sodium chloride | 0.5 % |
| | pH 7 |

REFERENCE EXAMPLE 1

One day slant culture of *Xanthomonas oryzae* IFO - 3955 was inoculated into 100 ml. of medium A in a 1 liter flask, and grown under skating at 28°C for 20 hours. The cells were harvested by centrifugation, washed with 100 ml. of 0.05 M phosphate buffer solution of pH 6 and suspended in 20 ml. of said buffer solution. The suspension was distributed into test tubes at the rate of 2 ml. per tube. D-2-phenylglycinemethyl ester and each of the 7-amino-3-desacetoxycephalosporanic acid (7-ADCA) esters mentioned below were suspenced or dissolved in 3 ml. of a 0.1 N aqueous solution of $K_2HPO_4$ (adjusted to pH 6.0) to the concentrations of 60 mM and 30 mM, respectively, and the resulting suspension or solution was added to each of the above cell suspensions. Under stirring at 37°C, the reaction was allowed to take place and 0.5 ml. of respective samples were taken of the reaction mixture at 0-, 1-, 2- and 4- hours. After 2.0 ml. of tetrahydrofuran was added, each sample was centrifuged to separate the cells and denatured proteins from the supernatant, and the supernatant was measured for the residual amount of 7-ADCA ester, the production of cephalosporin ester, the percent recovery of the cephem nucleus, etc. These findings were compared with the values measured at 0-hour to ascertain the changes caused by the progress of the reaction.

The residual amount of 7-ADCA ester was determined by the procedure of taking a 0.5 ml. portion of the supernatant, removing the solvent by distillation, making up the volume of the distillation residue to 5.0 ml. with a 5 % aqueous solution of formic acid and measuring the ester by the method of L. P. Marrelli (J. Pharm. Sci. 57, 2172, (1968)). The product cephalosporin ester was detected by thin-layer chromatography on silica gel (developing solvents: (1) the upper layer of n-butanolacetic acid-water (4:1:5); (2) chloroform-acetone (8:2); (3) methylene chloride-ether (1:1)) as an ultraviolet-absorbing, ninhydrin-positive spot. The total percent recovery of cephem nucleus was calculated from the absorbance of the supernatant at 260 mμ. The recovery of the cephem nucleus was 100 % for all samples. The 7-ADCA esters used and the results of the reaction are tabulated below. As controls, 7-ADCA was also reacted under the same conditions.

Employing 1-day slant culture of *Xanthomonas citri* IFO-3835, the same procedure as above was taken, The result were summarized in the Table 1.

Throughout the Reference examples and Examples, production of cephalosporin ester was roughly estimated by a densitometer and was expressed by the following marks.

− : not detected
± : lower than 0.01 (molar ratio to the starting 7-ADCA ester)
+ : 0.01 - 0.05
++ : 0.05 - 0.3
+++ : more than 0.3 to harvest the cells. The cells were washed with 100 ml. of 0.05 M phosphate buffer solution of pH 6 once and, suspended in 20 ml. of said buffer solution. Each of the resulting suspensions was distributed into test tubes at the rate of 2 ml. per tube. Each of the cell suspensions thus prepared was added to the reaction system of D-2-phenylglycine methyl ester and each of 7-ADCA esters listed below in the same manner as Reference Example 1. The results are set forth in the following table.

Table 2

| 7-ADCA ester (Ester residue only is indicated) | Acetobacter pasteurianus IFO-3223 | | Acetobacter turbidans IFO-3225 | | Acetobacter xylinum IFO-8144 | | Gluconobacter suboxydans IFO-3130 | |
|---|---|---|---|---|---|---|---|---|
| | A | B | A | B | A | B | A | B |
| Benzyl | ± | <5 % | ± | <5 % | ± | <5 % | ± | <5 % |
| Bis-(p-methoxyphenyl)methyl | ± | <5 % | ± | <5 % | ± | <5 % | ± | <5 % |
| 2,2,2-Trichloroethyl | + | 8 % | + | 10 % | + | 7 % | ± | <5 % |
| Benzhydryl | ± | <5 % | ± | <5 % | ± | <5 % | ± | <5 % |
| 3,5-Dimethoxybenzyl | ± | <5 % | ± | <5 % | ± | <5 % | ± | <5 % |
| 3,5-Di-tert-butyl-4-hydroxybenzyl | + | <5 % | + | <5 % | + | <5 % | ± | <5 % |
| tert-Butyl | + | 6 % | + | 5 % | + | 5 % | ± | <5 % |
| Triphenylmethyl | ± | <5 % | ± | <5 % | ± | <5 % | ± | <5 % |
| H(7-ADCA)* | +++ | 70 % | +++ | 65 % | +++ | 55 % | ++ | 35 % |

*Data on 7-ADCA are for reaction mixtures after 1 hour; data on 7-ADCA ester are for reaction mixtures after 4 hours.
Note A: Production of cephalosporin ester B: Decrease of 7-ADCA ester

REFERENCE EXAMPLE 3

The respective 2-day slant cultures of the microorganisms listed below were inoculated into 100 ml. of medium C in a 1 liter flask and grown under shaking at 28°C for 20 hours. The resulting culture broths were centrifuged to harvest the cells, which were washed with 100 ml. of 0.05M phosphate buffer solution of pH 6 once and suspended in 20 ml. of said buffer solution.

Table 1

| 7-ADCA ester (Ester residue only is indicated) | Xanthomonas oryzae IFO-3955 | | Xanthomonas citri IFO-3835 | |
|---|---|---|---|---|
| | Production of cephalosporin ester | Decrease of 7-ADCA ester | Production of cephalosporin ester | Decrease of 7-ADCA ester |
| Benzyl | ± | <5 % | ± | <5 % |
| Bis-(p-methoxyphenyl)-methyl | ± | <5 % | ± | <5 % |
| 2,2,2-Trichloroethyl | + | 15 % | + | 12 % |
| Benzhydryl | ± | <5 % | ± | <5 % |
| 3,5-Dimethoxybenzyl | ± | <5 % | ± | <5 % |
| 3,5-Di-tert-butyl-4-hydroxybenzl | ± | <5 % | ± | <5 % |
| tert–Butyl | + | 7 % | + | 10 % |
| Triphenylmethyl | ± | <5 % | ± | <5 % |
| H(7–ADCA)* | +++ | 75 % | +++ | 80 % |

*Data for the reaction mixture after 1 hour. All other data are for reaction mixtures after 4 hours.

REFERENCE EXAMPLE 2

The respective 3-day slant cultures of the microorganisms listed below were inoculated into 100 ml. of medium B in a 1 liter flask. Each of the inoculated media was incubated under shaking at 28°C for 20 hours and the resultant culture broths were centrifuged Each of the suspensions was distributed into test tubes at the rate of 2 ml. per tube and each of the resulting cell suspensions was added to a reaction system comprising D-2-phenylglycine methyl ester and each of 7-ADCA esters listed below in the same manner as Reference Example 1. The results are set forth in the following table.

Table 3

| 7-ADCA ester (Ester residue only is indicated) | Mycoplana dimorpha IFO-13213 | | protaminobacter alboflavus IFO-13221 | | Pseudomonas melagenum IFO-12020 | | Pseudomonas maltophila IFO-12690 | |
|---|---|---|---|---|---|---|---|---|
| | A | B | A | B | A | B | A | B |
| Benzyl | ± | <5 % | ± | <5 % | ± | <5 % | ± | <5 % |
| Bis-(p-methoxyphenyl)-methyl | ± | <5 % | ± | <5 % | ± | <5 % | ± | <5 % |
| 2,2,2-Trichloroethyl | + | 12 % | + | 8 % | + | 10 % | + | 6 % |
| Benzhydryl | ± | <5 % | ± | <5 % | ± | <5 % | ± | <5 % |
| 3,5-Dimethoxybenzyl | ± | <5 % | ± | <5 % | ± | <5 % | ± | <5 % |
| 3,5-Di-t-butyl-4-hydroxybenzyl | ± | <5 % | ± | <5 % | ± | <5 % | ± | <5 % |
| t-Butyl | + | 8 % | ± | 5 % | + | 6 % | ± | <5 % |
| Triphenylmethyl | ± | <5 % | ± | <5 % | ± | <5 % | ± | <5 % |
| H(7-ADCA) | +++ | 65 % | +++ | 68 % | +++ | 70 % | ++ | 45 % |

Data on 7-ADCA are for reaction mixtures after 1 hour; data on 7-ADCA ester are for reaction mixtures after 4 hours.

Note A: Production of cephalosporin ester B: Decrease of 7-ADCA ester.

EXAMPLE 1

A loopful of each of 1-day slant culture of the microorganisms listed below was inoculated into 20 ml. of medium A in a 200 ml. flask, and cultivated under shaking at 28°C for 20 hours. Each of the resulting culture broths was centrifuged to harvest the cells, which were washed with 20 ml. of 0.05 M phosphate solution of pH 6 and suspended in 10 ml. of said buffer solution. Each of the suspensions thus prepared was distributed into test tubes at the rate of 2.5 ml. per tube. D-2-phenylglycine methyl ester and each of the 7-amino-3-desacetoxycephalosporanic acid (7-ADCA) esters listed below were dissolved in 2.5 ml. of the same phosphate buffer solution as above to the concentrations of 60 mM and 30 mM, respectively, and the solution was added to each of the above test tubes. The reaction was allowed to proceed under shaking at 37°C and 0.5 ml. of respective samples were taken of each reaction mixture at 0-, 30-, 60- and 120 minutes. To each of the samples was added 2.0 ml. of tetrahydrofuran and the cells and denatured proteins were removed by centrifugation. The supernatant thus obtained was then measured for the residual amount of 7-ADCA ester, the production of cephalosporin ester, the percent recovery of cephem nucleus and other variables. The findings were compared with the values found at 0-minute to ascertain the changes caused by the progress of the reaction. The amount of 7-ADCA ester was determined by sampling a 0.5 ml. portion of the above supernatant, removing the solvent by distillation, making up the residue to 5.0 ml. with a 5 % aqueous solution of formic acid and applying the Marreli's method as mentioned in Reference Example 1.

The product cephalosporin esters were detected respectively by thin-layer chromatography on silica gel (developing solvents; (1) the upper layer of n-butanolacetic acid-water (4:1:5); (2) chloroform-acetone (8:2)) as an ultraviolet-absorbing, ninhydrin-positive spot. The percent recovery of cephem nucleus was calculated from the absorbance of the supernatant at 260 mμ. The 7-ADCA esters used and the results found after 60 minutes' reaction are indicated in Table 4. As a control, 7-ADCA was reacted under the same conditions.

The cephalosporin esters thus produced from the methylsulfonylethyl ester, ethylsulfonylethyl ester and phenylsulfonylethyl ester, respectively, of 7-ADCA were found to be identical with chemically produced samples of cephalexin methylsulfonylethyl ester, cephalexin ethylsulfonylethyl ester and cephalexin phenylsulfonylethyl ester, respectively.

Table 4

| 7-ADCA ester (Ester residue only is indicated) | Xanthomonas oryzae IFO-3995 | | | Xanthomonas citri IFO-3835 | | |
|---|---|---|---|---|---|---|
| | Production of cephalosporin ester | Decrease of 7-ADCA ester | Recovery of cephem nucleus | Production* of cephalosporin ester | Decrease of 7-ADCA ester | Recovery of cephem nucleus |
| Methylsulfonylethyl | +++ | 80 % | >95 % | +++ | 85 % | >95 % |
| Ethylsulfonylethyl | +++ | 85 % | >95 % | +++ | 81 % | >95 % |
| Phenylsulfonylethyl | +++ | 70 % | >95 % | +++ | 75 % | >95 % |
| H(7-ADCA) | +++ | 72 % | >95 % | +++ | 82 % | >95 % |

EXAMPLE 2

A loopful of each of 3-day slant culture of the microorganisms listed in Table 5 was inoculated into 40 ml. of medium B in a 200 ml. flask and cultivated under shaking at 28°C for 48 hours. Each of the resulting culture broths was centrifuged to harvest the cells, which were washed with 40 ml. of 0.05 M phosphate buffer solution (pH 6.0) once and suspended in 10 ml. of said buffer. Each of the suspensions thus obtained was distributed into test tubes at the rate of 2.5 ml. per tube. To each of the cell suspensions thus prepared were added D-2-phenylglycine methyl ester and each of 7-ADCA esters listed below and the system was allowed to react for 60 minutes under the same conditions as Example 1. The results are indicated in Table 5.

Table 5

| 7-ADCA ester (Ester residue only is indicated) | Acetobacter pasteurianus IFO-3223 | | | Acetobacter turbidans IFO-3225 | | | Acetobacter xylinum IFO-8144 | | | Gluconobacter suboxydans IFO-3130 | | |
|---|---|---|---|---|---|---|---|---|---|---|---|---|
| | A | B | C | A | B | C | A | B | C | A | B | C |
| Methylsulfonylethyl | +++ | 70 % | >95 % | +++ | 70 % | >95 % | +++ | 60 % | >95 % | ++ | 42 % | >95 % |
| Ethylsulfonylethyl | +++ | 65 % | >95 % | +++ | 65 % | >95 | | | | | | |
| Phenylsulfonylethyl % | +++ | 55 % | >95 % | ++ | 28 % | >95 % | | | | | | |
| | +++ | 73 % | >95 % | +++ | 65 % | >95 % | +++ | 48 % | >95 % | ++ | 31 % | >95 % |
| H(7-ADCA) | +++ | 72 % | >95 % | +++ | 68 % | >95 % | +++ | 58 % | >95 % | ++ | 30 % | >95 % |

Note
A: Production of cephalosporin ester
B: Decrease of 7-ADCA ester
C: Total recovery of cephem nucleus

EXAMPLE 3

A loopful of the respective 2-day slant cultures of the microorganisms listed below was inoculated into 40 ml. of medium C in a 200 ml. flask and incubated under shaking at 28°C for 48 hours. Each of the resulting culture broths was centrifuged to harvest the cells, which were then suspended in 10 ml. of 0.05 M phosphate buffer solution (pH 6.0). Each of the suspensions thus obtained was distributed into test tubes at the rate of 2.5 ml. per tube. To each of the suspensions prepared were added D-2-phenylglycine methyl ester (concentration: 60 mM) and each of 7-ADCA esters listed below (concentration: 30 mM) and the system was reacted at 37°C for 60 minutes. The results are set forth in Table 6. The cephalosporin esters produced and accumulated from the methylsulfonylethyl ester, ethylsulfonylethyl ester and phenylsulfonylethyl ester, respectively, of 7-ADCA were identified as the chemically produced samples of cephalexin methylsulfonylethyl ester, cephalexin ethylsulfonylethyl ester and cephalexin phenylsulfonylethyl ester, respectively.

20 ml. each of culture broths. The cells were harvested from each broth, suspended in 10 ml. of 0.05 M phosphate buffer solution (pH 6.0) and distributed into 4 test tubes at the rate of 2.5 ml. per tube. D-2-Phenylglycine methyl ester and each of the 7-ADCA esters mentioned below were dissolved in 2.5 ml. of the same phosphate buffer solution as above (pH 6.0) to the concentrations of 60 mM and 30 Mm, respectively, and the resulting solution was added to each of the test tubes. The reaction was allowed to proceed under stirring at 37°C for 60 minutes. The 7-ADCA esters used were the corresponding methoxymethyl ester, methylthiomethyl ester and methylsulfinylmethyl ester and the cephalosporin esters accumulated were identified with the chemically produced samples of cephalexin methoxymethyl ester, cephalexin methylthiomethyl ester and cephalexin methylsulfinylmethyl ester, respectively. The results of these reactions are shown in Table 7.

Table 6

| 7-ADCA ester (Ester residue only is indicated) | Mycoplana dimorpha IFO-13213 | | | Protaminobacter alboflavus IFO-13221 | | | Pseudomonas melanogenum IFO-12020 | | | Pseudomonas maltophila IFO-12690 | | |
|---|---|---|---|---|---|---|---|---|---|---|---|---|
| | A | B | C | A | B | C | A | B | C | A | B | C |
| Methylsulfonylethyl | +++ | 65 % | >95 % | +++ | 60 % | >95 % | +++ | 70 % | >95 % | ++ | 40 % | >95 % |
| Ethylsulfonylethyl | +++ | 60 % | >95 % | +++ | 53 % | >95 % | +++ | 62 % | >95 % | ++ | 35 % | >95 % |
| Phenylsulfonylethyl | +++ | 55 % | >95 % | +++ | 62 % | >95 % | +++ | 65 % | >95 % | + | 25 % | >95 % |
| H(7-ADCA) | +++ | 62 % | >95 % | +++ | 60 % | >95 % | +++ | 65 % | >95 % | ++ | 42 % | >95 % |

Note
A: Production of cephalosporin ester
B: Decrease of 7-ADCA ester
C: Total recovery of cephem nucleus Table 7

| 7-ADCA ester (Ester residue only is indicated) | Xanthomonas oryzae IFO-3995 | | | Xanthomonas citri IFO-3835 | | |
|---|---|---|---|---|---|---|
| | A | B | C | A | B | C |
| Methoxymethyl | +++ | 68 % | >95 % | +++ | 70 % | >95 % |
| Methoxythiomethyl | +++ | 72 % | >95 % | +++ | 65 % | >95 % |
| Methylsulfinylmethyl | +++ | 75 % | >95 % | +++ | 73 % | >95 % |
| H(7-ADCA) | +++ | 70 % | >95 % | +++ | 78 % | >95 % |

Note
A: Production of cephalosporin ester
B: Decrease of 7-ADCA ester
C: Total recovery of cephem nucleus

EXAMPLE 4

*Xanthomonas oryzae* IFO-3995 and *Xanthomonas citri* IFO-3835 were respectively cultivated for 20 hours in the manner described in Example 1 to obtain

EXAMPLE 5

In the same manner as Example 2, *Acetobacter pasteurianus* IFO-3223, *Acetobacter turbidans* IFO-3225 and *Acetobacter xylinum* IFO-8144 were cultivated respectively for 20 hours to prepare 40 ml. each of culture broths. The cells were harvested from each broth and suspended in 10 ml. of 0.05 M phosphate buffer solution (pH 6.0). The suspension was the distributed into 4 test tubes at the rate of 2.5 ml. per tube. D-2-phenylglycine methyl ester and each of the 7-ADCA esters listed below were dissolved in 2.5 ml. of said phosphate buffer solution to the concentrations of 60 mM and 30 mM, respectively, and the resulting solution was added to each of the test tubes. The reaction was thus allowed to proceed under stirring at 37°C for 60 minutes. The 7-ADCA esters used were the corresponding methylsulfinylmethyl ester, cyanoethyl ester and aminoethyl ester and the cephalosporin esters accumulated were identified with the chemically produced samples of cephalexin methylsulfinylmethyl ester, cephalexin cyanoethyl ester and cephalexin aminoethyl ester, respectively. The results of these reactions are shown in Table 8.

ml. of a culture broth, which was then centrifuged to harvest the cells. The cells were suspended in 10 ml. of distilled water. Meanwhile, 10 ml. of an aqueous solution (pH 6.0) containing 80 mM of D-2-phenylglycine methyl ester hydrochloride and 40 mM of 7-aminocephalosporanic acid (7-ACA) methoxymethyl ester was prepared and admixed with 10 ml. of the cell suspension obtained above. The system was thus allowed to react under stirring at 37°C for 30 minutes. During the reaction, the system was maintained at pH 6.0. At the end of the reaction, the amount of cephaloglycine methoxymethyl ester accumulated in the system was 12.5 mM as determined by an enzymatic method (J. Am. Chem. Soc. 94, 4035, (1972)).

Table 8

| 7-ADCA ester (Ester residue only is indicated) | Acetobacter pasteurianus IFO-3223 | | | Acetobacter turbidans IFO-3225 | | | Acetobacter xylinum IFO-8144 | | |
|---|---|---|---|---|---|---|---|---|---|
| | A | B | C | A | B | C | A | B | C |
| Methylsulfinyl-methyl | +++ | 73 % | >95 % | +++ | 85 % | >95 % | ++ | 55 % | >95 % |
| Cyanoethyl | ++ | 34 % | >95 % | ++ | 38 % | >95 % | ++ | 25 % | >95 % |
| Aminoethyl | +++ | 58 % | >95 % | ++ | 35 % | >95 % | ++ | 28 % | >95 % |
| H(7-ADCA) | +++ | 70 % | >95 % | +++ | 70 % | >95 % | +++ | 60 % | >95 % |

Note
A: Production of cephalosporin ester
B: Decrease of 7-ADCA ester
C: Total recovery of cephem nucleus

EXAMPLE 6

The cells of *Acetobacter turbidans* IFO-3225 from its 3-day slant culture were inoculated into 200 ml. of medium B in a 1 liter flask and incubated at 28°C for 48 hours. The resulting culture broth was centrifuged to harvest the cells, which were then suspended in 50 ml. of distilled water. Fifty milliliters of an aqueous solution (pH 6.0) containing 160 mM of D-2-phenylglycin methyl ester and 80 mM of 7-ADCA methylsulfonylethyl ester was prepared and admixed with 50 ml. of the cell suspension prepared above. The system was allowed to react under stirring at 37°C for 30 minutes. During the reaction, the pH of the system was maintained at 6.0 with 2N NaOH solution. After the reaction had been completed, the amount of cephalosporin ester accumulated was 28.5 mM (as measured by polarimetry). The system was cooled and centrifuged to remove the cells. The supernatant fluid was adjusted to pH 4.5 and allowed to stand at 4°C overnight. The crystals of D-phenylglycine were removed and the filtrate was concentrated under reduced pressure at a temperature not exceeding 30°C to one-third of its original volume. The concentrate was again allowed to stand at 4°C overnight. The precipitate formed was removed and the supernatant was chromatographed using a column of Amberlite XAD-2. The column was irrigated with water to collect cephalexin ester fractions. The fractions rich in the desired ester were pooled and lyophilized to obtain 1.2 g. of powdery cephalexin methylsulfonylethyl ester (purity: 93 % approx.); melting point: 154°–152°C, $(\alpha)_D^{24} = +102°$ (c=0.5 %, H$_2$O); $E_{1cm}^{1\%}$ 260 (260mμ).

EXAMPLE 7

*Xanthomonas citri* IFO-3835 was cultivated for 20 hours in the same manner as Example 1 to prepare 20

EXAMPLE 8

A loopful of *Acetobacter turbidans* IFO-3225 cells from its 3-day slant culture was inoculated into 20 ml. of medium B in a 100 ml. flask and incubated at 28°C under shaking for 24 hours. The cells were harvested by centrifugation and suspended in 5 ml. of distilled water. Meanwhile, 5 ml. of a distilled water solution (pH 6.0) containing 160 mM of DL-α-amino(2'-thienyl)-acetic acid methyl ester hydrochloride and 80 mM of 7-ADCA methylsulfonylethyl ester was prepared and admixed with the above cell suspension. The system was allowed to react at 37°C for 1 hour, the pH of the system being held at 6.0 with 5N NaOH, whereby 27.5 mM of DL-7-[α-amino-(2'-thienyl) acetamido]-3-desacetoxy-3-cephem-4-carboxylic acid methylsulfonylethyl ester was accumulated in the reaction mixture.

EXAMPLE 9

A loopful of *Xanthomonas citri* IFO-3835 cells from its 2-day slant culture was inoculated into 20 ml. of medium A in a 100 ml. flask and incubated at 28°C for 20 hours. The cells were harvested by centrifugation and suspended in 5 ml. of distilled water. Meanwhile, 5 ml. of a distilled water solution (pH 6.0) containing 160 mM of D-α-amino(p-hydroxyphenyl)acetic acid methyl ester hydrochloride and 80 mM of 7-ADCA methylsulfonylethyl ester was prepared and admixed with the above cell suspension and the system was allowed to react at 37°C for 1 hour, the pH being maintained at 6.0 with 5 N NaOH aqueous solution. The amount of D-7-[α-amino(p-hydroxyphenyl)acetamido]-3-desacetoxy-3-cephem-4-carboxylic acid methylsulfonylethyl ester accumulated in the reaction mixture was 29.3 mM.

What is claimed is:
1. A method for the production of a cephalosporin compound of the formula:

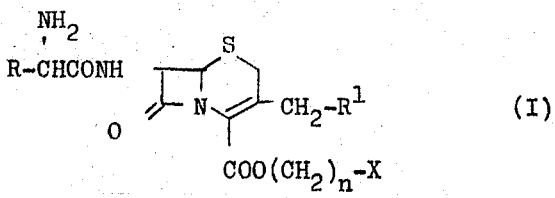

wherein R stands for a six-membered cyclic hydrocarbon residue which is either substituted or unsubstituted and either saturated or unsaturated, or an unsaturated five-membered heterocyclic residue containing one hetero atom in its ring; $R^1$ stands for a hydrogen atom or $-OR^2$ wherein $R^2$ is an organic group; $n$ is 1 or 2; and X is $-OR^3$, $-SO_mR^3$, $-NH_2$ or $-CN$, wherein $R^3$ stands for an alkyl group of 1 to 3 carbon atoms or a phenyl group and $m$ is 0, 1 or 2, which comprises subjecting a mixture of (1) an α-substituted -α-amino acid of the formula:

or a reactive derivative thereof wherein R has the same meaning defined above and (2) a 7-aminocephem compound of the formula:

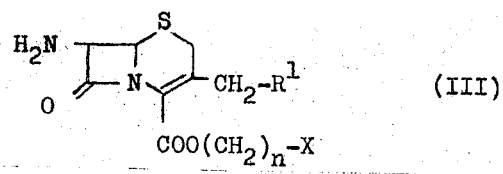

wherein $R^1$, $n$ and X have the same meaning as defined above in an aqueous medium to the enzymatic action of a microorganism which is capable of synthesizing a cephalosporin of the formula (I) from an α-substituted-α-amino acid of the formula (II) or its reactive derivative and a 7-aminocephem compound of the formula (III), the microorganism belonging to a family Pseudomonadaceae.

2. A method according to claim 1, wherein the α-substituted acid or its reactive derivative and the 7-aminocephem compound are contacted with a culture broth of the microorganism or with a cephalosporin-synthesizing-enzyme-containing processed matter obtained from the culture broth.

3. A method according to claim 2, wherein the contact is carried out at a temperature ranging from about 5° to about 50°C and at a pH ranging from about 4 to about 8.

4. A method according to claim 2, wherein the concentration of the 7-aminocephem compound in the aqueous medium is in a range from about 0.1 to about 10.0 % (weight/volume) and that of the α-substituted-α-amino acid or its reactive derivative is in a range from about 0.1 to about 20 %. (weight/volume).

5. A method according to claim 1, wherein X is $-OR^3$, wherein $R^3$ stands for an alkyl of 1 to 3 carbon atoms or a phenyl group.

6. A method according to claim 1, wherein X is $-SO_mR^3$ wherein $R^3$ stands for an alkyl of 1 to 3 carbon atoms or a phenyl group and $m$ is 0, 1 or 2.

7. A method according to claim 1, wherein X stands for amino group.

8. A method according to claim 1, wherein X stands for cyano group.

9. A method according to claim 1, wherein the reactive derivative of the α-substituted-α-amino acid is an alkyl ester, an aralkyl ester, an aryl ester or an alkylthio ester of the same.

10. A method according to claim 1, wherein the microorganism belongs to a genus Mycoplana, Protaminobacter, Acetobacter, Gluconobacter, Xanthomonas or Pseudomonas.

11. A method according to claim 1, wherein the microorganism is *Acetobacter acetosus, Gluconobacter albidus, Acetobacter aurantium, Gluconobacter cerinus, Gluconobacter industrius, Gluconobacter dioxyacetonics, Gluconobacter gluconicus, Gluconobacter liquefaciens, Gluconobacter melanogenus, Gluconobacter oxydans, Acetobacter pasteurianus, Gluconobacter suboxydans, Acetobacter turbidans, Acetobacter xylinum, Xanthomonas campestris, Xanthomonas cucurbitae, Xanthomonas hyacinthi, Xanthomonas phaseoli, Xanthomonas physalidiacola, Xanthomonas citri, Xanthomonas pruni, Xanthomonas oryzae, Pseudomonas convexa, Pseudomonas maltophilla, Pseudomonas melanogenum, Pseudomonas vendrelli, Mycoplana dimorpha, Mycoplana bullata* or *Protaminobacter alboflavus.*

* * * * *